US010513460B2

(12) United States Patent
Kerobo et al.

(10) Patent No.: US 10,513,460 B2
(45) Date of Patent: Dec. 24, 2019

(54) CEMENTITIOUS COMPOSITE MATERIAL INCLUDING A PLURALITY OF FILLED FIBERS

(71) Applicant: Construction Research & Technology GmbH, Trostberg (DE)

(72) Inventors: Charles Kerobo, Bloomfield Hills, MI (US); Emmanuel Attiogbe, Solon, OH (US); Thomas Chirayil, Danbury, CT (US); Roger Reinicker, Hockessin, DE (US); Dan Vojtko, Ravenna, OH (US); Steve Schaef, Brook Park, OH (US); John Randolph, Ypsilanti, MI (US)

(73) Assignee: Construction Research & Technology GmbH, Trostberg (DE)

( * ) Notice: Subject to any disclaimer, the term of this patent is extended or adjusted under 35 U.S.C. 154(b) by 145 days.

(21) Appl. No.: 14/899,376

(22) PCT Filed: May 20, 2014

(86) PCT No.: PCT/EP2014/060279
§ 371 (c)(1),
(2) Date: Dec. 17, 2015

(87) PCT Pub. No.: WO2014/202312
PCT Pub. Date: Dec. 24, 2014

(65) Prior Publication Data
US 2016/0130181 A1 May 12, 2016

Related U.S. Application Data

(60) Provisional application No. 61/837,971, filed on Jun. 21, 2013.

(51) Int. Cl.
*C04B 16/06* (2006.01)
*B29C 48/05* (2019.01)
(Continued)

(52) U.S. Cl.
CPC .......... *C04B 16/0633* (2013.01); *B29C 48/05* (2019.02); *C04B 20/0048* (2013.01);
(Continued)

(58) Field of Classification Search
CPC . C04B 16/0633; C04B 20/0048; C04B 28/02; C04B 20/0068; B29C 47/0014; B29C 48/05
See application file for complete search history.

(56) References Cited

U.S. PATENT DOCUMENTS 4,118,326 A * 10/1978 Login .................... D06M 7/00
252/8.84
4,209,336 A * 6/1980 Previte ................. C04B 24/28
106/724
(Continued)

FOREIGN PATENT DOCUMENTS

CN 1888161 A 1/2007
JP H 06-219797 A 8/1994

OTHER PUBLICATIONS

Yang et al. Silica modified PP fiber for improving crack-resistance of cementitious composites. Advanced Materials Research vols. 332-334, pp. 2058-2064. Feb. 9, 2011 (Year: 2011).*
(Continued)

*Primary Examiner* — John E Uselding
(74) *Attorney, Agent, or Firm* — Curatolo Sidoti Co., LPA; Salvatore A. Sidoti

(57) ABSTRACT

A composite material includes a cementitious composition and a plurality of fibers disposed in the cementitious composition. Each of the plurality of fibers includes a plastic component. Each of the plurality of fibers further includes a surfactant and a metal oxide, each independently heterogeneously dispersed throughout each of the plurality of fibers. A method of forming the composite material includes the step of combining the plastic component, the surfactant, and
(Continued)

the metal oxide, to form the plurality of fibers. The method further includes the step of disposing the plurality of fibers in the cementitious composition to form the composite material.

23 Claims, 6 Drawing Sheets

(51) Int. Cl.
     *C04B 28/02*      (2006.01)
     *C04B 20/00*      (2006.01)
     *B29L 31/00*      (2006.01)

(52) U.S. Cl.
     CPC .......... *C04B 20/0068* (2013.01); *C04B 28/02* (2013.01); *B29L 2031/731* (2013.01)

(56) References Cited

U.S. PATENT DOCUMENTS

| | | | |
|---|---|---|---|
| 6,569,525 | B2 | 5/2003 | Rieder et al. |
| 6,911,077 | B2 | 6/2005 | Zucker |
| 6,942,727 | B2 | 9/2005 | Daczko et al. |
| 7,192,643 | B2 | 3/2007 | Perez et al. |
| 2002/0110686 | A1 | 8/2002 | Dugan |
| 2006/0264557 | A1 | 11/2006 | Lustiger et al. |
| 2007/0181040 | A1 | 8/2007 | Li et al. |
| 2008/0044654 | A1 | 2/2008 | Cadoret et al. |
| 2009/0305038 | A1 | 12/2009 | Duran et al. |
| 2010/0173547 | A1 | 7/2010 | Katayama et al. |

OTHER PUBLICATIONS

Schmolka, Irving Block Polymer Nonionic Surfactants in Textiles. JAOCS, vol. 59, No. 7 (Jul. 1982) (Year: 1982).*

International Search Report for Application No. PCT/EP2014/060279 dated Oct. 7, 2014, 4 pages.

Daniel, James I et al., "Fiber Reinforced Concrete Developments and Innovations", American Concrete Institute, SP-142-Tensile and Compressive Strengths and Polypropylene Fiber Reinforced Concrete, 1994, pp. 61-72.

Joshi, Mangala et al., "Studies on Composite Filaments from Nanoclay Reinforced Polypropylene", Fibers and Polymers, Korean Fiber Society, Seoul, KR, vol. 5, No. 1, Jan. 1, 2004, pp. 59-67, XP009093169.

Zhang, Xiuqin et al., "Polypropylene/Montmorillionite Composites and Their Application in Hybrid Fiber Preparation By Melt-Spinning", Journal of Applied Polymer Science, Wiley, vol. 92, Apr. 1, 2004, pp. 552-558, XP003017473.

English language abstract for Zhiqian et al., "Application of Nano-Silica Modified Fiber in Cementitious Materials", Journal of Southeast University, vol. 40, Suppl. II, Nov. 2010, 1 page.

Zhiqian et al., "Application of Nano-Silica Modified Fiber in Cementitious Materials", Journal of Southeast University, vol. 40, Suppl. II, Nov. 2010, pp. 49-55.

English language abstract and machine-assisted English translation for CN 1888161 extracted from espacenet.com database on Aug. 9, 2017, 16 pages.

Chinese Office Action for corresponding CN 105324348, dated Mar. 12, 2018.

* cited by examiner

CEMENTITIOUS COMPOSITE MATERIAL INCLUDING A PLURALITY OF FILLED FIBERS

RELATED APPLICATIONS

This application is the National Stage of International Patent Application No. PCT/EP2014/060279, filed on May 20, 2014, which claims priority to and all the advantages of U.S. Patent Application No. 61/837,971, filed on Jun. 21, 2013, the content of which is incorporated herein by reference.

FIELD OF THE DISCLOSURE

The present disclosure generally relates to a composite material including a plurality of fibers and a method of forming the composite material. More specifically, the plurality of fibers includes a particular plastic component, a surfactant, and a metal oxide.

DESCRIPTION OF THE RELATED ART

Fibers formed from thermoplastic materials (e.g. plastic fibers) tend to be chemically inert, fairly thermally stable, and have high tensile strengths which are ideal for reinforcing composite materials. As a result, composite materials reinforced with thermoplastic fibers typically have improved physical properties such as improved tensile strength, improved load bearing capacity, and shrinkage and crack reduction, as compared to non-reinforced materials. However, such fibers typically have ordered structures and lack polar functionalities, such that they tend to exhibit undesirable hydrophobic characteristics in the composite materials which can result in poor ductility and flexural capacity. These undesirable hydrophobic characteristics typically result in poor adhesion between the fibers and the composite material thereby resulting in the composite material also having undesirable properties such as brittleness and a propensity for cracking.

Existing techniques to increase the adhesion between the plastic fibers and the composite materials include surface modifications which are typically uneconomical, unsustainable, technically challenging (e.g. in corona, plasma, and flame treatments), and harmful to the environment (e.g. by chromium and acidic oxidation). Other surface modifications include coating the plastic fibers with a wetting agent to increase hydrophilicity (or wetting). However, these wetting agents readily wear off the plastic fibers during mixing of the plastic fibers and the composite material. When the wetting agents wear off, hydrophobic portions of the plastic fibers are exposed. As described above, this exposure may result in the composite material exhibiting brittle behavior and a propensity to cracking. Accordingly, there remains an opportunity to develop an improved composite material.

SUMMARY OF THE DISCLOSURE

The present disclosure provides a composite material including a cementitious composition. The composite material further includes a plurality of fibers disposed in the cementitious composition. Each of the plurality of fibers includes a plastic component, a surfactant, and a metal oxide. Each of the surfactant and the metal oxide is independently heterogeneously dispersed throughout each of the plurality of fibers.

The present disclosure further provides a method of forming the composite material. The method includes the step of combining the plastic component, the surfactant, and the metal oxide to form the plurality of fibers. The method further includes the step of disposing the plurality of fibers in the cementitious composition to form the composite material.

BRIEF DESCRIPTION OF THE DRAWINGS

Other advantages of the present disclosure will be readily appreciated, as the same becomes better understood by reference to the following detailed description when considered in connection with the accompanying drawings wherein.

DETAILED DESCRIPTION OF THE DISCLOSURE

Figure 1:
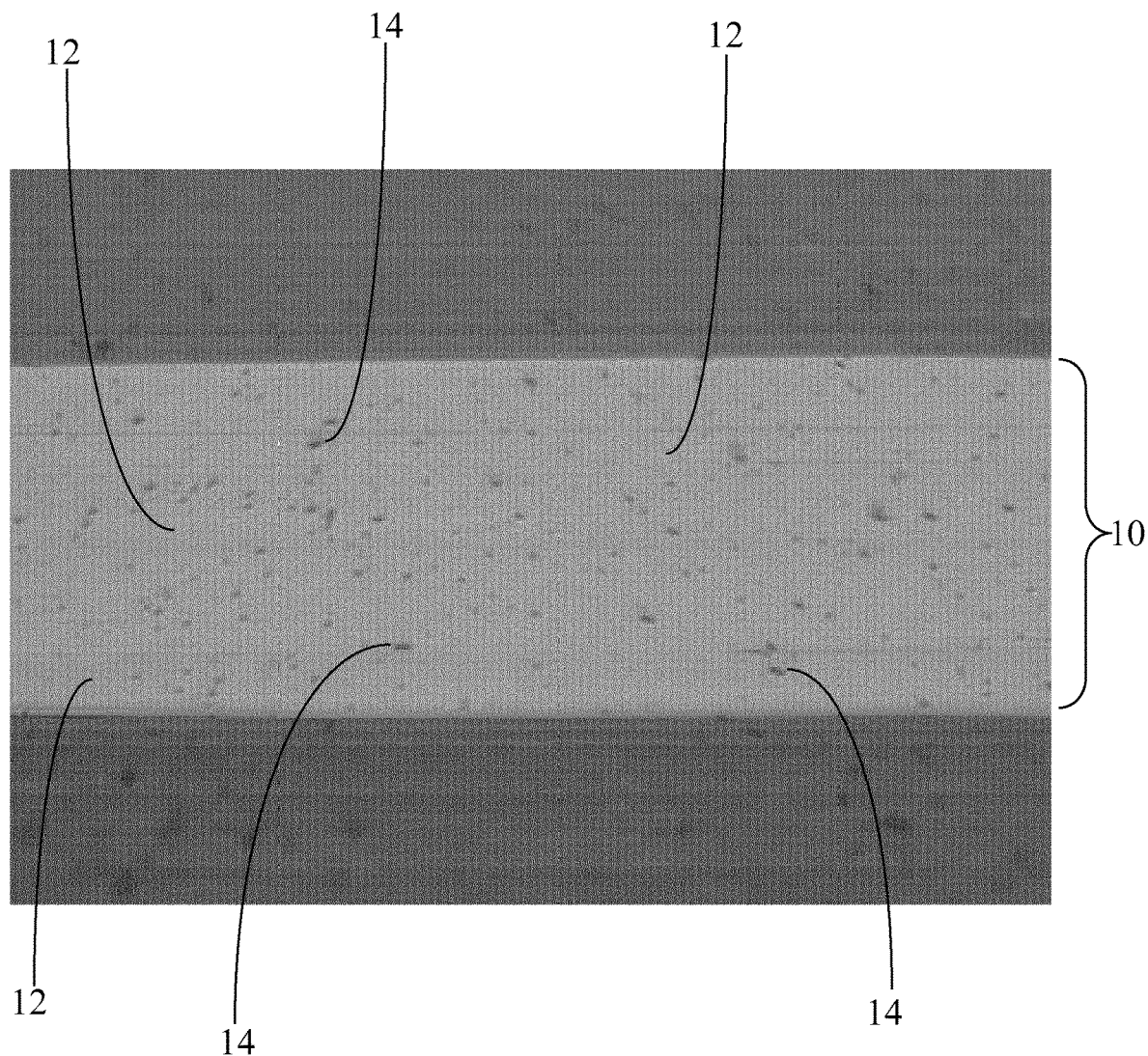
FIG. 1 is a Brightfield reflected light microscopy image illustrating a cross-sectional view of one embodiment of a fiber of this disclosure including a surfactant disposed throughout the fiber.

The present disclosure provides a composite material. The composite material includes a cementitious composition. The cementitious composition may be, include, or consist essentially of cement, concrete, mortar, or combinations thereof. In one embodiment, the terminology "consist essentially of" describes that the cementitious composition is free of other composite materials or compositions such as asphalt, etc.

Cement:

In one embodiment, the cementitious composition is (or is formed from) the reaction product of a hydraulic cement binder, aggregate, and water. The hydraulic cement binder may be alternatively described as cement before the formation of the cementitious composition, during formation of the cementitious composition, and/or after formation of the cementitious composition. Non-limiting examples of the hydraulic cement binder are or include Portland cement, Masonry cement, and/or Mortar cement. The hydraulic cement binder may be present prior to the formation of the cementitious composition in an amount of from 1 to 98 part(s) by weight, of from 40 to 85 parts by weight, or of from 60 to 80 parts by weight, each based on 100 parts by weight of the cementitious composition. In additional non-limiting embodiments, all values and ranges of values, both whole and fractional, within one or more of the aforementioned ranges, are hereby expressly contemplated.

The aggregate may include coarse and/or fine aggregate as understood in the art. The aggregate may be present prior to, during, and/or after the formation of the cementitious composition in an amount of from 1 to 98 part(s) by weight, or of from 5 to 50 parts by weight, or of from 10 to 30 parts by weight, each based on 100 parts by weight of the cementitious composition. In additional non-limiting embodiments, all values and ranges of values, both whole and fractional, within one or more of the aforementioned ranges, are hereby expressly contemplated.

The water may be present prior to, during, and/or after the formation of the cementitious composition in an amount of from 1 to 98 part(s) by weight, of from 5 to 50 parts by weight, or of from 10 to 30 parts by weight, each based on 100 parts by weight of the cementitious composition. In additional non-limiting embodiments, all values and ranges of values, both whole and fractional, within one or more of the aforementioned ranges, are hereby expressly contemplated.

The cementitious composition may also include other materials such as limestone, hydrated lime, fly ash, blast furnace slag, silica fume, water reducers, air entrainers, accelerators, retarders, polymeric fibers different from the plurality of fibers of this disclosure, steel fibers, or combinations thereof. These materials, and their weight percentage usage in this disclosure, may be selected by one of skill in the art.

Concrete:

In other embodiments, the cementitious composition is further defined as concrete before the formation of the cementitious composition, during formation of the cementitious composition, and/or after formation of the cementitious composition. Concrete may be (or be formed from) the reaction product of a hydraulic cement binder such as Portland cement, fine and/or coarse aggregate such as sand, gravel and crushed stone, and water. The hydraulic cement binder, the aggregate, and the water are typically mixed thoroughly to produce a heterogeneous mixture of concrete. Typically, the hydraulic cement binder and the water initially form a gel that undergoes a process of hydration. As the concrete sets, the gel can become rigid thereby fixing the aggregate and curing the concrete.

The hydraulic cement binder may be present prior to the formation of the concrete in an amount of from 1 to 98 part(s) by weight, of from 40 to 85 parts by weight, or of from 60 to 80 parts by weight, each based on 100 parts by weight of the concrete. The aggregate may be present prior to, during, and/or after the formation of the concrete in an amount of from 1 to 98 part(s) by weight, or of from 5 to 50 parts by weight, or of from 10 to 30 parts by weight, each based on 100 parts by weight of the concrete. The water may be present prior to, during, and/or after the formation of the concrete in an amount of from 1 to 98 part(s) by weight, of from 5 to 50 parts by weight, or of from 10 to 30 parts by weight, each based on 100 parts by weight of the concrete. In additional non-limiting embodiments, all values and ranges of values, both whole and fractional, within one or more of the aforementioned ranges, are hereby expressly contemplated.

Mortar:

In still other embodiments, the cementitious composition is further defined as mortar. Mortar may be (or be formed from) the reaction product of a hydraulic cement binder such as Portland cement, fine aggregate such as sand, and water. Formation of mortar generally follows a similar process of hydration as the concrete described above. The hydraulic cement binder may be present prior to formation of the mortar in an amount of from 1 to 98 part(s) by weight, of from 40 to 85 parts by weight, or of from 60 to 80 parts by weight, each based on 100 parts by weight of the mortar. The aggregate may be present prior to, during, and/or after the formation of the mortar in an amount of from 1 to 98 part(s) by weight, of from 5 to 50 parts by weight, or of from 10 to 30 parts by weight, each based on 100 parts by weight of the mortar. The water may be present prior to, during, and/or after the formation of the mortar in an amount of from 1 to 98 part(s) by weight, of from 5 to 50 parts by weight, or of from 10 to 30 parts by weight, each based on 100 parts by weight of the mortar. In additional non-limiting embodiments, all values and ranges of values, both whole and fractional, within one or more of the aforementioned ranges, are hereby expressly contemplated.

Plurality of Fibers:

The composite material further includes a plurality of fibers 10. The terminology, "fiber(s)" may be substituted below for either "the plurality of fibers", "each of the plurality of fibers", or both. The fibers 10 may be in monofilament form, collated fibrillated form, ribbon form, or any core-sheath, core-shell, mono component, or bi-component form or any other form known in the art. The fibers 10 may be of any size and/or dimension known in the art. For example, each of the plurality of fibers 10 may have a length of from ⅛ to 3 inch(es), of from ¼ to 2 inch(es), or of from ½ to 1 inch. In various embodiments, each of the plurality of fibers 10 may have a diameter of from 0.01 to 2 millimeters, of from 0.03 to 1 millimeter(s), of from 0.04 to 0.5 millimeters, 0.01 to 0.10 millimeters, or of from 0.1 to 0.2 millimeters. In additional non-limiting embodiments, all values and ranges of values, both whole and fractional, within one or more of the aforementioned ranges, are hereby expressly contemplated. Also, fibers with a diameter less than or equal to 0.30 millimeters may be described as "microfibers" whereas those fibers with a diameter of greater than 0.30 millimeters may be described as "macrofibers."

The plurality of fibers 10 is disposed in the cementitious composition. In other words, the plurality of fibers 10 may be disposed on at least one surface of the cementitious composition or disposed within all or a portion of the cementitious composition. At least one surface of the cementitious composition may be free of the plurality of fibers 10. It is to be appreciated that the terminology "disposed" may be used interchangeably with the terminology "dispersed" throughout the present disclosure. In certain embodiments, the plurality of fibers 10 is present in an amount of from 0.1 to 10 parts by volume based on 100 parts by volume of the composite material. Alternatively, the plurality of fibers 10 are present in an amount of from 0.5 to 5 parts by volume, 1 to 3 part(s) by volume, or 1.5 to 2 parts by volume, each based on 100 parts by volume of the composite material. In additional non-limiting embodiments, all values and ranges of values, both whole and fractional, within one or more of the aforementioned ranges, are hereby expressly contemplated.

Plastic Component:

Each of the plurality of fibers 10 includes a plastic component 12. The plastic component 12 may be, include, consist essentially of, or consist of any plastic known in the art. For example, in one embodiment, the terminology "consists essentially of" describes that the plastic component 12 is free of non-plastics, e.g. compounds other than those described below as options for use as the instant plastic component. The plastic component 12 may be provided as a solid or a liquid. The plastic component 12 may be, include, consist essentially of, or consist of a homopolymer which is formed from a single repeating unit or a copolymer which is formed from a differing of repeating units. The plastic component 12 may be, include, consist essentially of, or consist of a polymerization product of monomers including, but not limited to, aliphatic monomers, aromatic monomers, and combinations thereof. The plastic component 12 may be, include, consist essentially of, or consist of a polymerization product of monomers including unsaturated monomers such as alkenes and dienes having carbon-carbon double bonds, alkynes having carbon-carbon triple bonds, and styrene monomers. The plastic component 12 may be, include, consist essentially of, or consist of a polymer blend of homopolymers, copolymers, or combinations thereof. In certain embodiments, the plastic component 12 has an average molecular weight of at least 1,000 g/mol. Alternatively, the plastic component 12 has an average molecular weight of at least 3,000 g/mol, of at least 8,000 g/mol, of at least 10,000 g/mol, of at least 12,000 g/mol, of at least 13,000 g/mol, of at least 15,000 g/mol, of at least 25,000 g/mol, of at least 50,000 g/mol, of at least 100,000 g/mol, of at least 500,000 g/mol, or of at least 1,000,000 g/mol. In other embodiments, the plastic component 12 has an average molecular weight of from 1,000 g/mol to 2,000,000 g/mol. Alternatively, the plastic component 12 has an average molecular weight of from 1,000 g/mol to 1,000,000 g/mol, of from 1,000 g/mol to 500,000 g/mol, of from 3,000 g/mol to 100,000 g/mol, of from 3,000 g/mol to 50,000 g/mol, of from 5,000 g/mol to 25,000 g/mol, or of from 5,000 g/mol to 15,000 g/mol. In additional non-limiting embodiments, all values and ranges of values, both whole and fractional, within one or more of the aforementioned ranges, are hereby expressly contemplated.

In certain embodiments, the plastic component 12 is, includes, consists essentially of, or consists of a polyolefin, polyolefin elastomer, polystyrene, polyvinyl chloride, or combinations thereof. For example, in one embodiment, the terminology "consists essentially of" describes that the fibers 10 and/or the plastic component 12 are free of other organic and/or inorganic polymers that are not the plastic component or one or more of the polymers described above. In various embodiments, the polyolefin is polyethylene, polypropylene, polymethylpentene, polybutene-1, or combinations thereof. In other embodiments, the polyolefin elastomer is polyisobutylene, ethylene propylene rubber, ethylene propylene diene monomer rubber. For descriptive purposes only, the generic chemical structures of polyethylene, polypropylene, polystyrene, and polyvinyl chloride are shown below:

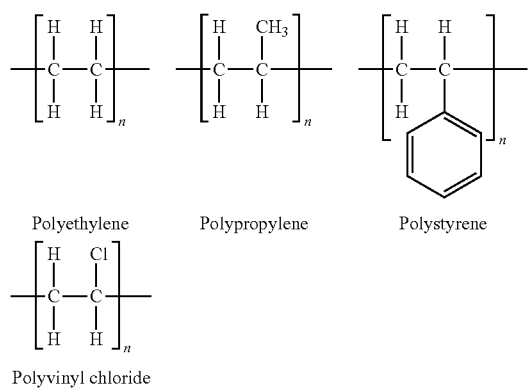

wherein n may be any integer, e.g. from 350 to 11,000. In additional non-limiting embodiments, all values and ranges of values, both whole and fractional, within one or more of the aforementioned ranges, are hereby expressly contemplated.

In various embodiments, the plastic component 12 is polypropylene. The polypropylene may be isotactic, syndiotactic, or atactic. For descriptive purposes only, generic chemical structures of atactic, isotactic, and syndiotactic polypropylene are shown below:

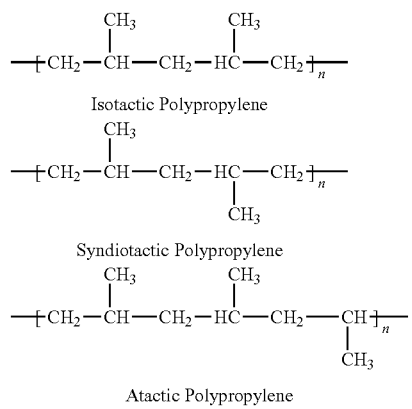

wherein n may be any integer. A non-limiting example of a suitable polypropylene is commercially available from LyondellBasel Industries of Houston, Tex., under the trade name of Pro-Fax™, such as Pro-Fax™ 6301.

Each of the plurality of fibers 10 typically includes at least 90 parts by weight of the plastic component 12 based on 100 parts by weight of each of the plurality of fibers 10. However, the plastic component 12 may be used in a lesser weight percent. Alternatively, each of the plurality of fibers 10 may include at least 92 parts by weight, at least 94 parts by weight, at least 96 parts by weight, at least 97 parts by weight, at least 98 parts by weight, or at least 99 parts by weight of the plastic component 12, each based on 100 parts by weight of each of the plurality of fibers 10. In additional non-limiting embodiments, all values and ranges of values, both whole and fractional, within one or more of the aforementioned ranges, are hereby expressly contemplated.

Surfactant:

Each of the plurality of fibers 10 further includes a surfactant 14. The surfactant 14 is not particularly limited and may include any known in the art. For example, the surfactant 14 may be, include, consist essentially of, or consist of, an anionic surfactant, a cationic surfactant, a zwitterionic surfactant, an amphoteric surfactant, a nonionic surfactant, or combinations thereof. In various embodiments, the surfactant 14 may be, include, consist essentially of, or consist of, one or more of an alcohol alkoxylate, an alcohol block/heteric alkoxylate, a polyoxyethylene/polyoxypropylene block/heteric copolymer, a fatty alcohol, a fatty alkoxy alcohol, a polyalkylene glycol, an alkylphenol alkoxylate, or combinations thereof. The surfactant 14 may be provided as a solid, paste, flake, and/or liquid. Alternatively, the surfactant 14 may be, include, consist essentially of, or consist of a soap, detergent, wetting agent, dispersant, emulsifier, foaming agent, bactericide, corrosion inhibitor, anti-static agent, surface-active agent, a polymeric surfactant, a surface-active polymer, etc. For example, in one or more embodiments described above, the terminology "consists essentially of" may describe that the surfactant 14 is free of non-surfactants or may include one or more types of surfactants and be free of one or more other types of surfactants.

The surfactant 14 is heterogeneously dispersed throughout each of the plurality of fibers 10. Said differently, the surfactant 14 is distributed generally or approximately evenly throughout the fiber 10 such that a cross-section of the fiber 10 exhibits surfactant 14 present in approximately the entirety of the cross-section (see, e.g. FIG. 1), as appreciated by a person of skill in the art.

Typically, the fibers 10, which include the surfactant 14 heterogeneously dispersed throughout the fiber 10, exhibit hydrophilic characteristics. These hydrophilic characteristics may improve the adhesion of the fiber 10 to or in the cementitious composition which may result in increased ductility of the composite material. This increased ductility may resist brittleness and provide resistance to cracking.

The fibers 10 which include the surfactant 14 may be coated with a variety of coatings such as additional surfactants (which may be the same or different than those described as surfactant 14) and/or lubricants and/or subjected to a variety of treatments such as corona, treatment, plasma treatment, flame treatment, chromium and/or acidic oxidation. However, it is to be appreciated that these coatings and/or treatments are not required.

In certain embodiments, the surfactant 14 has an average molecular weight of less than or equal to 100,000 g/mol. Alternatively, the surfactant 14 may have an average molecular weight of less than or equal to 90,000 g/mol, less than or equal to 50,000 g/mol, less than or equal to 25,000 g/mol, less than or equal to 20,000 g/mol, less than or equal to 15,000 g/mol, less than or equal to 10,000 g/mol, less than or equal to 7,000 g/mol, less than or equal to 5,000 g/mol, less than or equal to 2,000 g/mol, less than or equal to 1,000 g/mol, or less than or equal to 500 g/mol. While it is understood that molecular weight and molar mass represent different physical properties, with regard to the surfactant 14 of the present disclosure, the molecular weight can hereinafter be used to describe both molecular weight and molar mass. In additional non-limiting embodiments, all values and ranges of values, both whole and fractional, within one or more of the aforementioned ranges, are hereby expressly contemplated.

In certain embodiments, the surfactant 14 is an alcohol alkoxylate. The alcohol alkoxylate is not particularly limited but may be an alcohol alkoxylate with a fatty alcohol moiety having the formula:

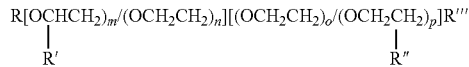

wherein R is $C_8$ to $C_{18}$, such as $C_8$, $C_9$, $C_{10}$, $C_{11}$, $C_{12}$, $C_{13}$, $C_{14}$, $C_{15}$, $C_{16}$, $C_{17}$, or $C_{18}$ branched or straight chain alkyl group, m is 0 to 14, such as 0, 1, 2, 3, 4, 5, 6, 7, 8, 9, 10, 11, 12, 13, or 14, n is 0 to 14, such as 0, 1, 2, 3, 4, 5, 6, 7, 8, 9, 10, 11, 12, 13, or 14, o is 0 to 14, such as 0, 1, 2, 3, 4, 5, 6, 7, 8, 9, 10, 11, 12, 13, or 14, p is 0 to 14, such as 0, 1, 2, 3, 4, 5, 6, 7, 8, 9, 10, 11, 12, 13, or 14, and R' is —$CH_3$, —$CH_2CH_3$, and mixtures thereof, R'' is —$CH_3$, —$CH_2CH_3$, and mixture thereof, and R''' is —OH, —$CH_3$, —O—$C_3$-$C_{18}$ hydroxyalkyl group and mixtures thereof. In additional non-limiting embodiments, all values and ranges of values, both whole and fractional, within one or more of the aforementioned ranges, are hereby expressly contemplated.

The alcohol alkoxylate may alternatively be an alcohol with one or more fatty alcohol moiety alkoxylate having the formula:

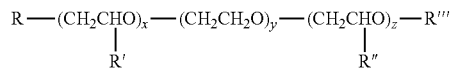

wherein R is $C_8$ to $C_{18}$, such as $C_8$, $C_9$, $C_{10}$, $C_{11}$, $C_{12}$, $C_{13}$, $C_{14}$, $C_{15}$, $C_{16}$, $C_{17}$, or $C_{18}$ branched or straight chain alkyl group, x is 0 to 14, such as 0, 1, 2, 3, 4, 5, 6, 7, 8, 9, 10, 11, 12, 13, or 14, y 3 to 14, such as 3, 4, 5, 6, 7, 8, 9, 10, 11, 12, 13, or 14, z is 0 to 20, such as 0, 1, 2, 3, 4, 5, 6, 7, 8, 9, 10, 11, 12, 13, 14, 15, 16, 17, 18, 19, or 20, p is 0 to 14, such as 0, 1, 2, 3, 4, 5, 6, 7, 8, 9, 10, 11, 12, 13, or 14, and R' is —$CH_3$, —$CH_2CH_3$, and mixtures thereof, R'' is —$CH_3$, —$CH_2CH_3$, and mixture thereof, and R''' is —OH, —$CH_3$, —O—$C_3$-$C_{18}$ hydroxyalkyl group and mixtures thereof. In additional non-limiting embodiments, all values and ranges of values, both whole and fractional, within one or more of the aforementioned ranges, are hereby expressly contemplated.

The alcohol alkoxylate may alternatively be a fatty alcohol having one or more oxyethylate moieties having the formula:

wherein R is $C_{10}$ to $C_{13}$ such as $C_{10}$, $C_{11}$, $C_{12}$, or $C_{13}$ branched or straight chain alkyl group, and x is 4 to 10, such as 4, 5, 6, 7, 8, 9, or 10. In additional non-limiting embodiments, all values and ranges of values, both whole and fractional, within one or more of the aforementioned ranges, are hereby expressly contemplated.

The alcohol alkoxylate is typically nonionic, but may be cationic, anionic, amphoteric or zwitterionic. The alcohol alkoxylate may have a degree of ethoxylation of from 1 to 100. Alternatively, the alcohol alkoxylate may have a degree of ethoxylation of from 20 to 100, of from 40 to 100, of from 60 to 100, or of from 70 to 90. An increase in the degree of ethoxylation may increase the adhesion of the fiber 10 to the cementitious composition. Typically the alcohol alkoxylate has an average molecular weight of from 500 to 10,000 g/mol. Alternatively, the alcohol alkoxylate has an average molecular weight of from 1,000 to 10,000 g/mol, of from 2,000 to 4,500 g/mol, of from 2,500 to 4,000 g/mol, or of from 3,000 to 4,000 g/mol. A non-limiting example of a suitable alcohol alkoxylate is commercially available from BASF Corporation of Florham Park, N.J. In additional non-limiting embodiments, all values and ranges of values, both whole and fractional, within one or more of the aforementioned ranges, are hereby expressly contemplated.

In various embodiments, the surfactant 14 is an alcohol block/heteric alkoxylate. In other embodiments, the surfactant 14 is a polyoxyethylene/polyoxypropylene block/heteric copolymer (EO/PO block/heteric copolymer).

The EO/PO block/heteric copolymer may be any block or heteric/block polyoxyalkylene polymer for example having the formula:

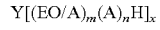

wherein Y is the nucleus of an active hydrogen containing organic compound having a functionality of x from 1 to 6, such as 1, 2, 3, 4, 5, or 6 and (i) 2 to 6 carbon atoms, such as 2, 3, 4, 5, or 6 carbon atoms and 2 to 3 reactive hydrogen atoms or (ii) 6 to 18 carbon atoms, such as 6, 7, 8, 9, 10, 11, 12, 13, 14, 15, or 16, 17, or 18 carbon atoms and 1 to 3 reactive hydrogen atoms, such as 1, 2, or 3 reactive hydrogen atoms. A is typically a lower alkylene oxide selected from the group consisting of propylene oxide, butylene oxide, tetrahydrofuran or mixtures thereof. Up to 25 percent by weight, up to 20 percent by weight, up to 15 percent by weight, up to 10 percent by weight, or up to 5 percent by weight of A may be reacted directly with the active hydrogen containing organic compound in admixture with ethylene oxide, 75 percent by weight or more, 80 percent by weight or more, 85 percent by weight or more, 90 percent by weight or more, or 95 percent by weight or more of A may be subsequently reached to produce the polymer. Moreover, m may be 0 to 110, such as 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, or 110. N may be 0 to 26, such as 0, 1, 2, 3, 4, 5, 6, 7, 8, 9, 10, 11, 12, 13, 14, 15, 16, 17, 18, 19, 20, 21, 22, 23, 24, 25, or 26. In additional non-limiting embodiments, all values and ranges of values, both whole and fractional, within one or more of the aforementioned ranges, are hereby expressly contemplated.

The EO/PO block/heteric copolymer may also be a block or heteric/block polyoxyalkylene polymer having the formula:

$$Y[(A)_o(EO)_m(A)_nH]_x$$

wherein Y is the nucleus of an active hydrogen containing organic compound having a functionality of x from 1 to 6, such as 1, 2, 3, 4, 5, or 6 and (i) 2 to 6 carbon atoms, such as 2, 3, 4, 5, or 6 carbon atoms and 2 to 3 reactive hydrogen atoms or (ii) 6 to 18 carbon atoms, such as 6, 7, 8, 9, 10, 11, 12, 13, 14, 15, or 16, 17, or 18 carbon atoms and 1 to 3 reactive hydrogen atoms, such as 1, 2, or 3 reactive hydrogen atoms. A is typically a lower alkylene oxide selected from the group consisting of propylene oxide, butylene oxide, tetrahydrofuran or mixtures thereof. Up to 25 percent by weight, up to 20 percent by weight, up to 15 percent by weight, up to 10 percent by weight, or up to 5 percent by weight of A may be reacted directly with the active hydrogen containing organic compound in admixture with ethylene oxide, 75 percent by weight or more, 80 percent by weight or more, 85 percent by weight or more, 90 percent by weight or more, or 95 percent by weight or more of A may be subsequently reached to produce the polymer. Moreover, m may be 0 to 110, such as 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, or 110. N may be 0 to 26, such as 0, 1, 2, 3, 4, 5, 6, 7, 8, 9, 10, 11, 12, 13, 14, 15, 16, 17, 18, 19, 20, 21, 22, 23, 24, 25, or 26. O may be 0 to 26, such as 0, 1, 2, 3, 4, 5, 6, 7, 8, 9, 10, 11, 12, 13, 14, 15, 16, 17, 18, 19, 20, 21, 22, 23, 24, 25, or 26. In additional non-limiting embodiments, all values and ranges of values, both whole and fractional, within one or more of the aforementioned ranges, are hereby expressly contemplated.

The EO/PO block/heteric copolymer may alternatively be a block or heteric/block polyoxyalkylene polymer having the formula:

$$Y[(A)_o(EO/A)_m(A)_nH]_x$$

wherein Y is the nucleus of an active hydrogen containing organic compound having a functionality of x from 1 to 6, such as 1, 2, 3, 4, 5, or 6, and (i) 2 to 6 carbon atoms, such as 2, 3, 4, 5, or 6 carbon atoms and 2 to 3 reactive hydrogen atoms or (ii) 6 to 18 carbon atoms, such as 6, 7, 8, 9, 10, 11, 12, 13, 14, 15, or 16, 17, or 18 carbon atoms and 1 to 3 reactive hydrogen atoms, such as 1, 2, or 3 reactive hydrogen atoms. A is typically a lower alkylene oxide selected from the group consisting of propylene oxide, butylene oxide, tetrahydrofuran or mixtures thereof. Up to 25 percent by weight, up to 20 percent by weight, up to 15 percent by weight, up to 10 percent by weight, or up to 5 percent by weight of A may be reacted directly with the active hydrogen containing organic compound in admixture with ethylene oxide, 75 percent by weight or more, 80 percent by weight or more, 85 percent by weight or more, 90 percent by weight or more, or 95 percent by weight or more of A may be subsequently reached to produce the polymer. Moreover, m may be 0 to 110, such as 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, or 110. N may be 0 to 26, such as 0, 1, 2, 3, 4, 5, 6, 7, 8, 9, 10, 11, 12, 13, 14, 15, 16, 17, 18, 19, 20, 21, 22, 23, 24, 25, or 26. O may be 0 to 26, such as 0, 1, 2, 3, 4, 5, 6, 7, 8, 9, 10, 11, 12, 13, 14, 15, 16, 17, 18, 19, 20, 21, 22, 23, 24, 25, or 26. In additional non-limiting embodiments, all values and ranges of values, both whole and fractional, within one or more of the aforementioned ranges, are hereby expressly contemplated.

The EO/PO block/heteric copolymer is typically non-ionic, but may be cationic, anionic, amphoteric or zwitterionic. The EO/PO block/heteric copolymer may terminate in a primary hydroxyl group, but may be different. In general, the EO/PO block/heteric copolymer is formed from repeating units polyethylene oxide and polypropylene oxide. The polyethylene oxide contributes to the degree of ethoxylation of the EO/PO block/heteric copolymer which, as described above, may increase the adhesion of the fiber 10 to or in the cementitious composition. Typically the EO/PO block/heteric copolymer has an average molecular weight of from 5,000 to 15,000 g/mol. Alternatively, the EO/PO block/heteric copolymer may have an average molecular weight of from 5,500 to 14,000 g/mol, of from 6,000 to 13,500 g/mol, of from 6,500 to 13,000 g/mol, or of from 7,000 to 13,000 g/mol. In additional non-limiting embodiments, all values and ranges of values, both whole and fractional, within one or more of the aforementioned ranges, are hereby expressly contemplated.

In certain embodiments, the surfactant 14 is a fatty alcohol. In other embodiments, the surfactant 14 is a fatty alkoxy alcohol. In still other embodiments, the surfactant 14 is a poly polyalkylene glycol.

In certain embodiments, the surfactant 14 is an alkylphenol alkoxylate. The alkylphenol alkoxylate is not particularly limited but may be an alkyl phenol alkoxylate having the formula:

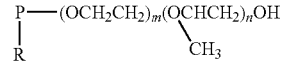

wherein P is a phenyl group, R is a $C_8$ or $C_9$ branched or straight chain alkyl group, m is 3 to 12, such as 3, 4, 5, 6, 7, 8, 9, 10, 11, or 12 and n is 0 to 12, such as 0, 1, 2, 3, 4, 5 6, 7, 8, 9, 10, 11, or 12. In additional non-limiting embodiments, all values and ranges of values, both whole and fractional, within one or more of the aforementioned ranges, are hereby expressly contemplated.

Each of the plurality of fibers 10 typically includes less than or equal to 10 parts by weight of the surfactant 14 based on 100 parts by weight of each of the plurality of fibers 10. Alternatively, each of the plurality of fibers 10 may include less than or equal to 8 parts by weight, less than or equal to 6 parts by weight, less than or equal to 4 parts by weight, less than or equal to 3 parts by weight, less than or equal to 2 parts by weight, or less than or equal to 1 parts by weight of the surfactant 14, each based on 100 parts by weight of each of the plurality of fibers 10. In additional non-limiting embodiments, all values and ranges of values, both whole and fractional, within one or more of the aforementioned ranges, are hereby expressly contemplated.

Metal Oxide:

Each of the plurality of fibers 10 also includes a metal oxide 16. The metal oxide 16 typically includes one or more oxygen atoms, e.g. in a −2 oxidation state. However, the metal oxide 16 is not limited as such and may be, include, consist essentially of, or consist of, any one or more metal oxide 16s known in the art. In one embodiment, the terminology "consist essentially of" describes that the metal oxide 16 is free of compounds or complexes that are not metal oxide 16s. The metal of the metal oxide 16 may be any known in the art, e.g. alkali, alkaline earth, transition metals, or metals of Groups IB, IIB, IIIA, IVA, VA, or VIA of the Periodic Table. In one embodiment, the metal oxide 16 is silicon dioxide ($SiO_2$). Although silicon may typically be described as a metalloid or as semi-metallic, for purposes of this disclosure, silicon is described as a metal for the purpose of the instant metal oxide 16. However, in one embodiment, it is contemplated that the terminology metal oxide 16 may be replaced with semi-metal oxide 16.

As is appreciated in the art, silicon dioxide is also known as silica, and is may exist in one or more forms including, but not limited to, fused quartz, crystal, fumed silica (e.g. pyrogenic silica), colloidal silica, silica gel, aerogel, and combinations thereof. The metal oxide 16 of this disclosure may be, include, consist essentially of, or consist of, silicon dioxide and/or any one or more of the aforementioned forms of silicon dioxide.

The metal oxide 16 is typically present in the plurality of fibers 10 in amounts of from 0.01 to 5.00, 0.1 to 5.0, 0.2 to 4.9, 0.3 to 4.8, 0.4 to 4.7, 0.5 to 4.6, 0.6 to 4.5, 0.7 to 4.4, 0.8 to 4.3, 0.9 to 4.2, 1.0 to 4.1, 1.1 to 4.0, 1.2 to 3.9, 1.3 to 3.8, 1.4 to 3.7, 1.5 to 3.6, 1.6 to 3.5, 1.7 to 3.4, 1.8 to 3.5, 1.9 to 3.4, 2.0 to 3.3, 2.1 to 3.2, 2.2 to 3.1, 2.3 to 3.0, 2.4 to 2.9, 2.5 to 2.8 or 2.6 to 2.7, parts by weight per 100 parts by weight of the plurality of fibers 10. In other embodiments, the metal oxide 16 is fumed silica (e.g. a reactive pozzolanic material) which includes 5 to 99 weight percent of amorphous silicon dioxide. In additional non-limiting embodiments, all values and ranges of values, both whole and fractional, within one or more of the aforementioned ranges, are hereby expressly contemplated.

In the instant composite material and/or in the cementitious composition itself, one or more metal hydroxides may be present or may be formed. For example, calcium hydroxide, which forms during cement hydration, may react with the metal oxide 16, e.g. silicon dioxide, in the fibers to provide (additional) interfacial binding strength for improved adhesion between the fibers and the cementitious composition. Such a reaction may form a metal silicate, e.g. a calcium silicate. Without intending to be bound by theory, it is believed that the presence of the metal oxide 16 forms reactive sites in the fibers as locations that can react with the metal hydroxide.

Figure 4A:
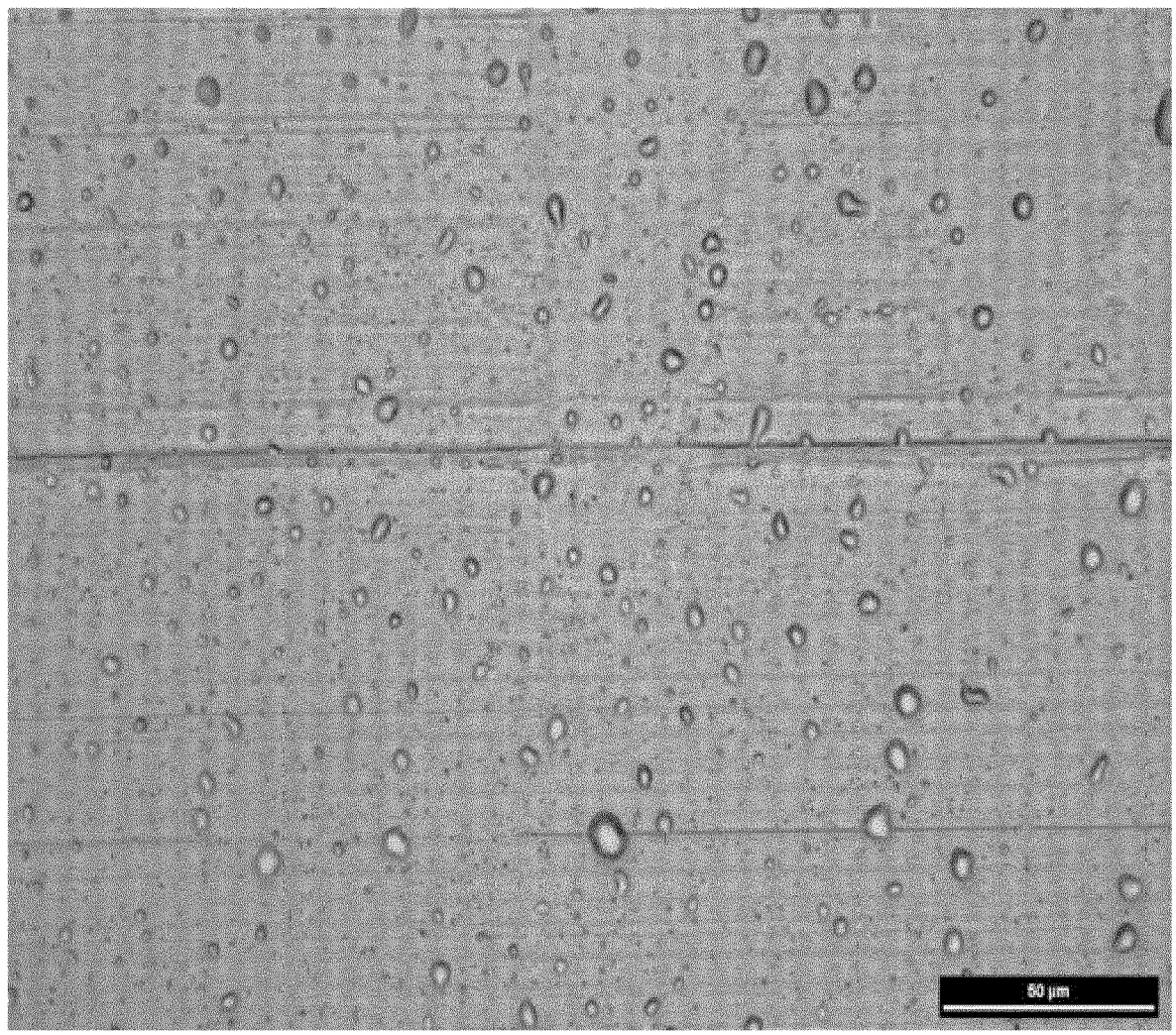
FIG. 4A is a SEM cross-sectional image of one embodiment of a fiber of this disclosure including a surfactant and silicon dioxide.
Figure 4B:
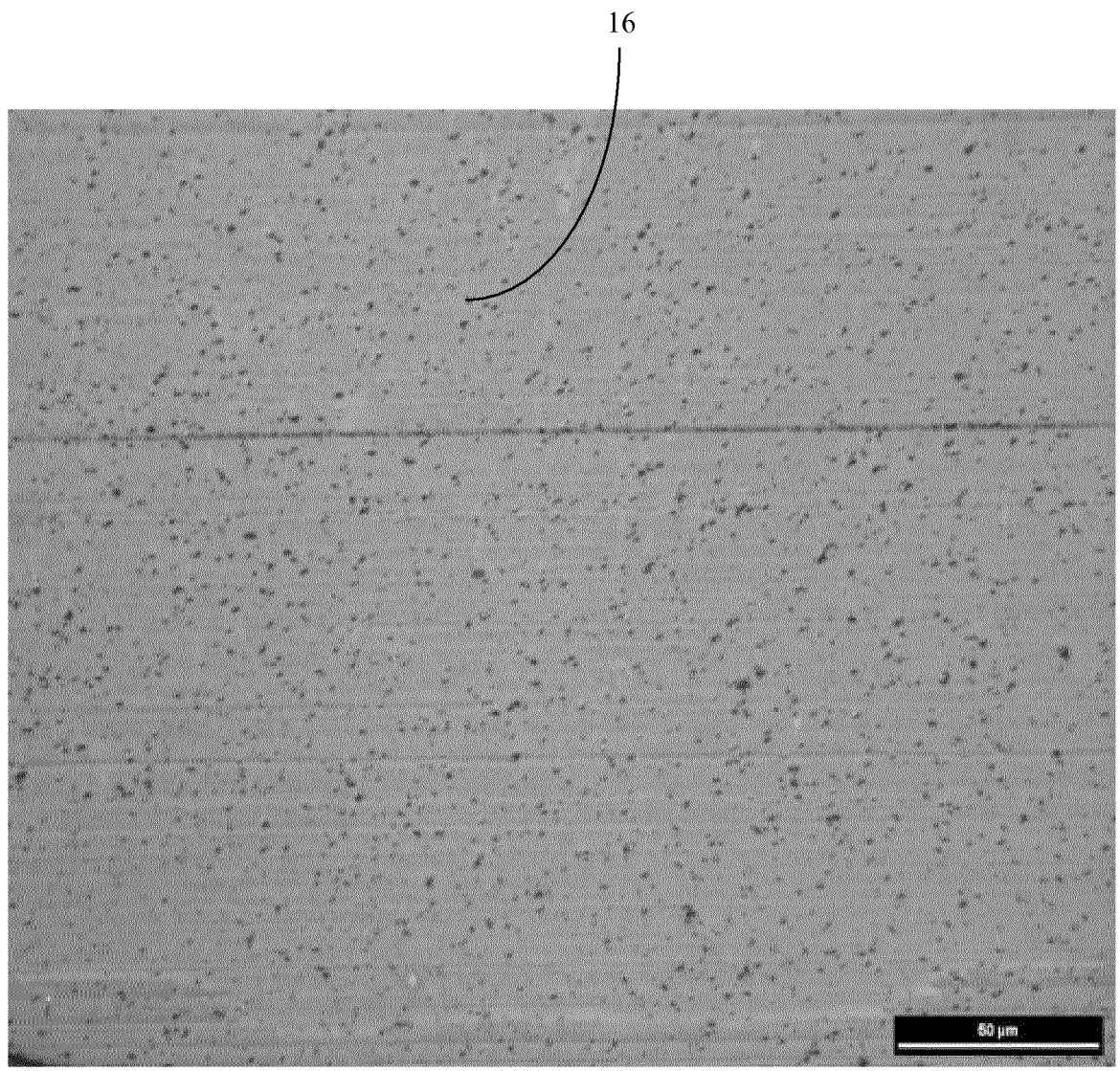
FIG. 4B is a SEM cross-sectional image of the fiber of FIG. 5A wherein the surfactant is removed but the silicon dioxide remains.
Figure 5:
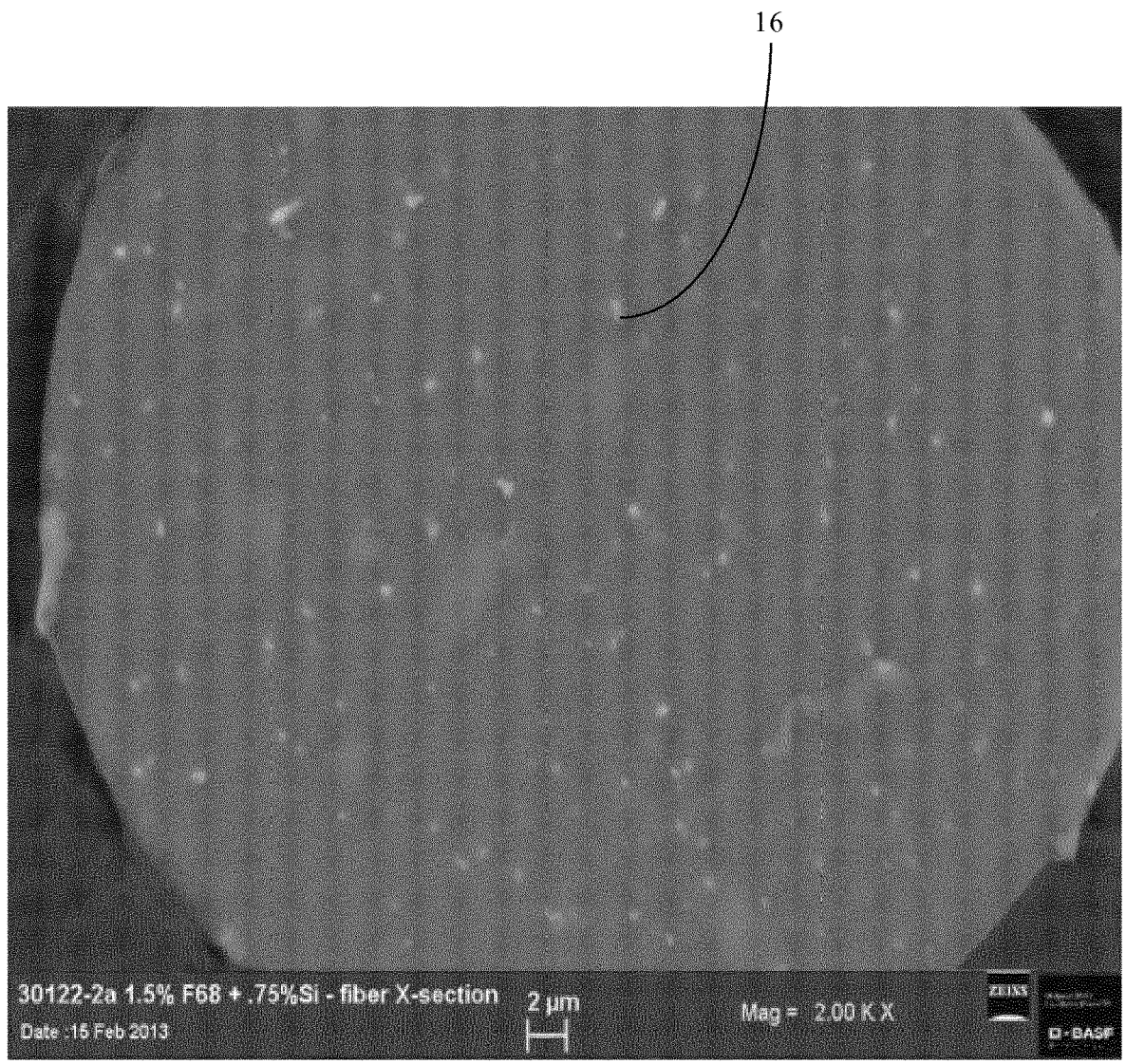
FIG. 5 is a SEM cross-sectional image of another embodiment of the fiber of this disclosure including a surfactant and silicon dioxide.
Figure 6:
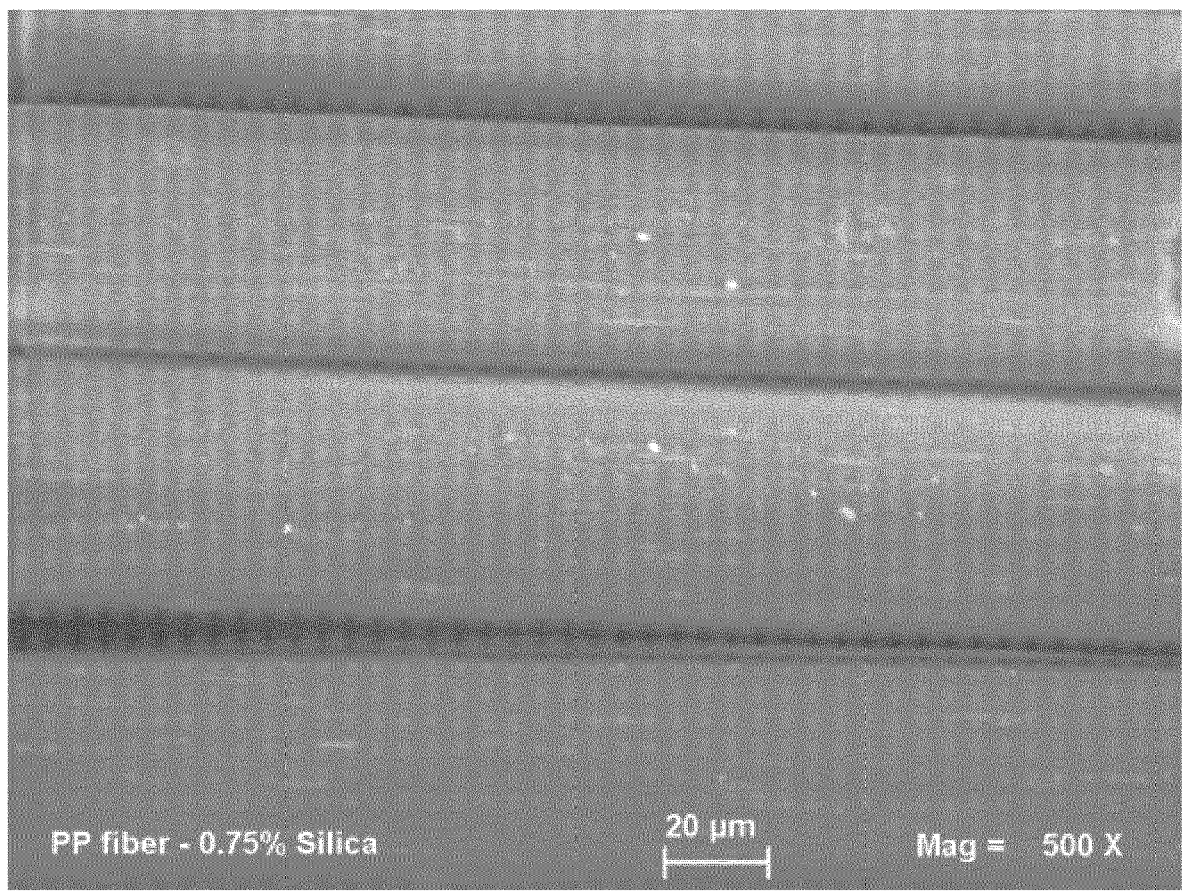
FIG. 6 is a backscattered electron (BSE) image of a bundle of fibers of this disclosure that include a surfactant and silicon dioxide.

The metal oxide 16 is, like the surfactant 14, also independently heterogeneously dispersed throughout each of the plurality of fibers 10. Said differently, the metal oxide 16 is distributed generally or approximately evenly throughout the fiber 10 such that a cross-section of the fiber 10 exhibits metal oxide 16 present in approximately the entirety of the cross-section (see, e.g. FIGS. 4B and 5), as appreciated by a person of skill in the art. The metal oxide 16 and the surfactant 14 may be dispersed in the plurality of fibers 10 in the same or in different patterns or quantities.

Additives:

Each of the plurality of fibers 10 may also include one or more additives. The additives may be antioxidants and/or light stabilizers. The antioxidant may be or include a first and/or a second antioxidant. However, it is to be appreciated that the fiber may include any number of antioxidants. The light stabilizer may be or include hindered amine light stabilizers (HALS). The additives typically minimize degradation of the plastic component 12 and the surfactant 14 from heat and shear during formation of the fiber 10. In addition, the additives typically provide the fiber 10 with long term heat stability.

The first antioxidant may be present in the plurality of the fibers in an amount of from 0.001 to 1 part(s) by weight, of from 0.01 to 0.2 parts by weight, or of from 0.05 to 0.15 parts by weight, each based on 100 parts by weight of each of the plurality of fibers 10. A non-limiting example of a suitable primary antioxidant is commercially available from BASF Corporation of Florham Park, N.J., under the trade name of Irganox®, such as Irganox® 3114 (AO) and Irganox® B 1411 (AO). In additional non-limiting embodiments, all values and ranges of values, both whole and fractional, within one or more of the aforementioned ranges, are hereby expressly contemplated.

The second antioxidant may be present in the plurality of fibers in an amount of from 0.001 to 1 part(s) by weight, of from 0.01 to 0.2 parts by weight, or of from 0.05 to 0.15 parts by weight, each based on 100 parts by weight of each of the plurality of fibers 10. A non-limiting example of a suitable secondary antioxidant is commercially available from BASF Corporation of Florham Park, N.J., under the trade name of Irgafos®, such as Irgafos® 168 (AO). In additional non-limiting embodiments, all values and ranges of values, both whole and fractional, within one or more of the aforementioned ranges, are hereby expressly contemplated.

The light stabilizer may be present in the plurality of fibers in an amount of from 0.01 to 2 parts by weight, of from 0.08 to 1 part(s) by weight, or of from 0.1 to 0.3 parts by weight, each based on 100 parts by weight of each of the plurality of fibers 10. A non-limiting example of a suitable light stabilizer is commercially available from BASF Corporation of Florham Park, N.J., under the trade name of Chimassorb®, such as Chimassorb® 2020. In additional non-limiting embodiments, all values and ranges of values, both whole and fractional, within one or more of the aforementioned ranges, are hereby expressly contemplated.

Typically, increasing the ductility and flexural toughness of the composite material lowers the brittleness of the composite material such that the tensile strength and energy absorption of the composite material is increased. Ductility of the composite material may be determined by (1) forming a dogbone specimen of the composite material and (2) testing the dog bone specimen in tension. The flexural toughness may be determined using ASTM C1550 in which a round panel specimen is tested in bending. Non-limiting examples of the composite material are evaluated for ductility below.

Method of Forming the Composite Material:

The present disclosure further provides a method of forming the composite material. The method includes the step of combining the plastic component 12, the surfactant 14, and the metal oxide 16 to form the plurality of fibers 10. The plastic component 12, the surfactant 14, and the metal oxide 16 may be combined by any method known in the art to form the plurality of fibers 10. In a non-limiting example, the plastic component 12, the surfactant 14, and the metal oxide 16 may be blended dry, and then compounded by extrusion to form extrudates. These extrudates may then be extruded, spun, and then drawn to form the plurality of fibers 10.

In certain embodiments, the plastic component 12, the surfactant 14, and the metal oxide 16 are combined to form a mixture prior to forming the plurality of fibers 10. The mixture may be described as a masterbatch. The plastic component 12, the surfactant 14, and the metal oxide 16 may be combined by any method known in the art to form the mixture. The plastic component 12, the surfactant 14, and the metal oxide 16 may be combined in a mixing vessel and/or a blender, such as a Henschell mixer. If present, the additives may also be combined with t the plastic component 12, the surfactant 14, and the metal oxide 16 to form the mixture. The plastic component 12, the surfactant 14, and the metal oxide 16 and, if present, the additives, may be blended thoroughly such that the surfactant 14 and, if present, the additives, are approximately uniformly dispersed in the mixture with the plastic component 12.

In certain embodiments, the step of combining the plastic component 12, the surfactant 14, and the metal oxide 16 to form the plurality of fibers 10 includes extruding the plastic component 12, the surfactant 14, and the metal oxide 16 through a first extruder at a temperature of from 185° C. to 215° C. to form at least one strand. The step of extruding the plastic component 12, the surfactant 14, and the metal oxide 16 to form at least one strand may alternatively be described as compounding. The plastic component 12, the surfactant 14, and the metal oxide 16 may be extruded by any extrusion process known in the art, such as direct extrusion, indirect extrusion and/or hydrostatic extrusion. It is believed that extruding the plastic component 12, the surfactant 14, and the metal oxide 16 to form at least one strand results in increased dispersion of the surfactant 14 in the fiber 10. Increased dispersion of the surfactant 14 in the fiber 10 may increase adhesion of the fiber 10 to the cementitious composition. In additional non-limiting embodiments, all values and ranges of values, both whole and fractional, within one or more of the aforementioned ranges, are hereby expressly contemplated.

The first extruder may be any extruder known in the art to form the at least one strand. The first extruder may be further defined as a single screw extruder, twin screw, or multiscrew extruder. In various embodiments, the first extruder is further defined as a single screw extruder. In other embodiments, the first extruder is further defined as a twin screw extruder. The first extruder may be further defined as a (fully) intermeshing extruder. The first extruder may be further defined as a co-rotating extruder. The first extruder may have a length to diameter ratio (L/D) of from 35 to 1 to 45 to 1, alternatively, 36 to 1 to 44 to 1, 37 to 1 to 43 to 1, 38 to 1 to 42 to 1, or 39 to 1 to 41 to 1. The first extruder may include a screw rotating at a speed of 140 to 160 revolutions per minute (RPM), alternatively, 145 to 155 RPM, 146 to 154 RPM, 147 to 153 RPM, 148 to 152 RPM, 149 to 151 RPM. The screw of the first extruder may be primarily conveying the mixture. The first extruder may be a Leistritz 27 mm co-rotating twin screw extruder. In additional non-limiting embodiments, all values and ranges of values, both whole and fractional, within one or more of the aforementioned ranges, are hereby expressly contemplated.

In various embodiments, the first extruder includes multiple heating zones, e.g. nine heating zones, with each heating zone at a temperature of from 185° C. to 215° C. However, it is to be appreciated that the first extruder may operate at any temperature known in the art. More specifically, the plastic component 12, the surfactant 14, and the metal oxide 16 may be extruded as a hot extrusion and/or a warm extrusion which may depend on the melt temperature of the plastic component 12, the surfactant 14, and the metal oxide 16. It is also to be appreciated that the first extruder may have any number of heating zones such as 1, 2, 3, 4, 5, 6, 7, 8, 10, 11, 12, 13, 14, 15, etc. with each heating zone independently at a temperature of from 185° C. to 215° C. In additional non-limiting embodiments, all values and ranges of values, both whole and fractional, within one or more of the aforementioned ranges, are hereby expressly contemplated.

In other embodiments, the step of combining the plastic component 12, the surfactant 14, and the metal oxide 16 to form the plurality of fibers 10 includes quenching the at least one strand with water and subsequently cutting the at least one strand quenched with water to form pellets. The at least one strand may be quenched in a water bath, by spray quenching, and/or by water wall quenching. In other embodiments, the at least one strand is quenched by air quenching to form pellets. Cutting the at least one strand quenched with water (or by air quenching) may be performed by any cutting method known in the art such as with a ConAir pelletizer. The pellets may have any dimensions and/or size distribution known in the art. In various embodiments, the pellets have a diameter of from 1/16 to 1/4 inch and a length of from 1/16 to 1/4 inch.

In various embodiments, the step of combining the plastic component 12, the surfactant 14, and the metal oxide 16 to form the plurality of fibers 10 includes extruding the pellets through a second extruder to form the plurality of fibers 10. The second extruder may be any extruder known in the art to form the plurality of fibers 10. The pellets may be extruded by extrusion spinning to form the plurality of fibers 10. Subsequent to formation of the plurality of fibers 10, the plurality of fibers 10 may be cut such that each of the plurality of fibers 10 has a length of 1/4 to 3 inches. However, it is to be appreciated that the plurality of fibers 10 may be cut to a length of any size known in the art.

The method also includes the step of disposing the plurality of fibers 10 in the cementitious composition to form the composite material. The plurality of fibers 10 may be disposed in the cementitious composition by any method know in the art. It is to be appreciated that the plurality of fibers 10 may be disposed in the aggregate, the binder, the water, cementitious materials, water reducers, air entrainers, accelerators, retarders, and/or fly ash prior to forming the cementitious composition so long as the plurality of fibers 10 is disposed in the cementitious composition.

It is to be appreciated that many changes can be made to the following examples, while still obtaining like or similar results. Accordingly, the following examples, illustrating embodiments of the composite material of the present disclosure, are intended to illustrate and not to limit the disclosure.

Examples

Polypropylene, a surfactant, a metal oxide, and additives are combined to form mixtures (Examples 1-3) in a Henschell mixer, as set forth in Table I below. An additional mixture (Comparative Example) that does not include the surfactant or the metal oxide is also formed in the same was, as also set forth in Table I below.

The polypropylene is in solid form as a powder and formed from a nominal 12 melt polypropylene index homopolymer. The mixture is blended thoroughly such that the surfactant, metal oxide, and the additives are uniformly dispersed with the polypropylene. The mixture is compounded in a Leistritz 27 mm co-rotating twin screw extruder (first extruder) to form at least one strand. The first extruder is a co-rotating and fully intermeshing extruder. The screw of the first extruder is primarily conveying and rotating at a speed of 150 RPM. The first extruder has a L/D of 40 to 1. The first extruder is equipped with a K-tron screw type feeder. The first extruder has nine heating zones with each zone having a temperature profile as shown below.

Zone #2: 190° C.
Zone #3: 195° C.
Zone #4: 200° C.
Zone #5: 200° C.
Zone #6: 200° C.
Zone #7: 200° C.
Zone #8: 200° C.
Zone #9: 200° C.
Melt Zone: 210° C.

The mixture is heated in Zone #2 and Zone #4 and the die is heated in Zone #9. The at least one strand is quenched in a water bath, and subsequently cut with a ConAir pelletizer to form pellets such that the pellets have a diameter of approximately ⅛ inch and a length of approximately ⅛ inch. The pellets are extruded in a second extruder to form the plurality of fibers. A plurality of (micro)fibers is cut to lengths of approximately ½ inch while a plurality of (macro) fibers is cut to lengths of approximately 2 inches.

The compositions of the fibers for Examples 1-3 and the Comparative Example are shown in Table I below. The performance differences among these fibers are evaluated in concrete mixtures with the compositions set forth in Table II.

TABLE I

| Component | Example 1 | Example 2 | Example 3 | Comparative Example |
|---|---|---|---|---|
| Polypropylene (w/w) | 98.2 | 97.45 | 96.7 | 99.7 |
| Surfactant (w/w) | 1.0 | 1.5 | 2.0 | — |
| HALS (w/w) | 0.2 | 0.2 | 0.2 | 0.2 |
| Antioxidant (w/w) | 0.1 | 0.1 | 0.1 | 0.1 |
| Metal Oxide | 0.5 | 0.75 | 1.0 | — |
| TOTAL (w/w) | 100 | 100 | 100 | 100 |

Polypropylene is a polypropylene homopolymer commercially available from LyondellBasell Industries as Pro-Fax™ 6301.

Surfactant is an EO/PO block/heteric copolymer commercially available from BASF Corporation.

HALS is a hindered amine light stabilizer commercially available from BASF Corporation as Chimassorb® 2020.

Antioxidant is an antioxidant commercially available from BASF Corporation as Irganox® B 1411 (AO).

The metal oxide is silicon dioxide, commercially available from Sigma-Aldrich as Silicon Dioxide, Product Number S5130.

Figure 2:
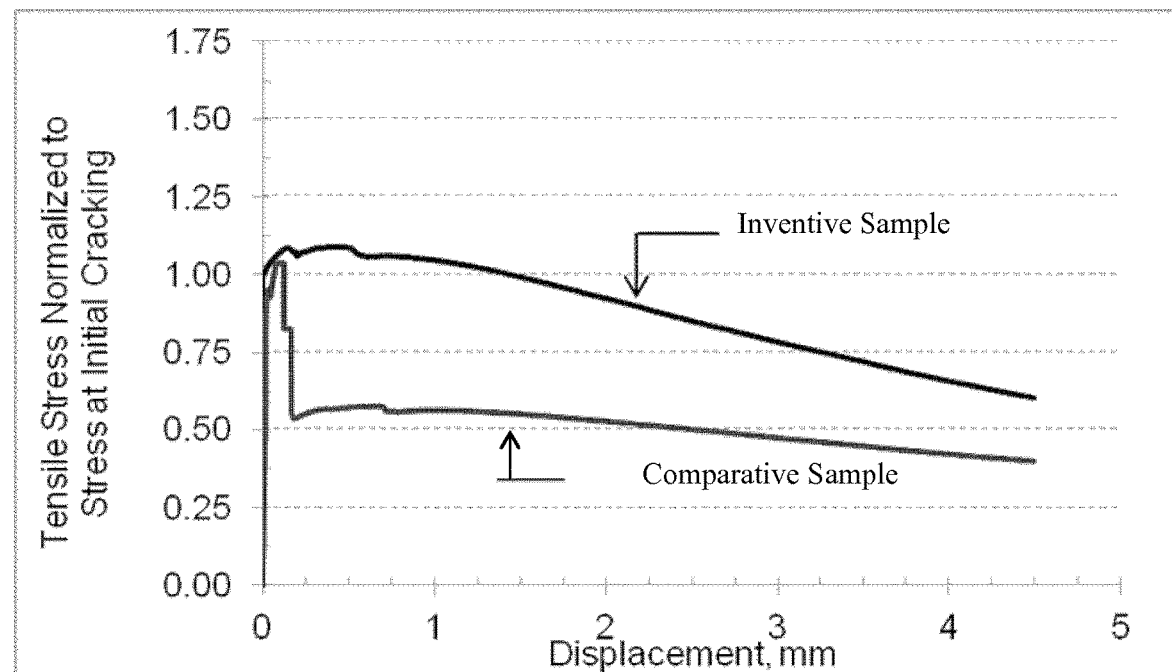
FIG. 2 is a line graph of tensile stress normalized to stress at initial cracking as a function of displacement of inventive and comparative sample of the Examples.

Microfibers of Examples 1 through 3 and the Comparative Example of Table I are each combined with concrete to each form a dogbone specimen of a composite material. The dogbone specimen is formed by first casting the composite material including concrete and the fibers. The dogbone specimen has an upper and lower end opposite to each other and a top and bottom surface extending along the dogbone specimen with the top and bottom surface opposite to each other. Next, the dogbone specimen is moisture cured for 7 days, and then air dried. The top and bottom surfaces of the dogbone specimen are then leveled by a grinder. The top and/or bottom surfaces are then marked 60 millimeters (mm) from each of the upper and lower ends. Next, the dogbone specimen is placed in an Instron test machine having a first and second clamp. The first clamp applies 70 psi of pressure to the upper end of the dogbone specimen and the second clamp applies 70 psi of pressure to the lower end of the dogbone specimen to ensure that the dogbone specimen does not slip. Load (tension stress) is then applied to the dogbone specimen by the Instron test machine at a loading rate of 0.03 millimeters per minute (mm/min) until an extension (displacement) of 5 mm is achieved or the load drops by fifty percent of the peak load. Finally, the tension stress over displacement is charted graphically. The composite materials including the microfibers of Examples 1 through 3 are evaluated for ductility against the composite material including the fiber of the Comparative Example. Additionally, the composite materials including the macrofibers of Examples 1 through 3 are evaluated according to ASTM C 1550 for flexural toughness against the composite material including the fiber of the Comparative Example. Table II below illustrates compositions for the composite materials and FIG. 2 provides ductility represented by tensile stress versus displacement for the composite materials with microfibers. Table III provides a measure of the relative effectiveness of the compositions for the composite materials with macrofibers.

TABLE II

| | Example | | | |
|---|---|---|---|---|
| Component | Example 1 | Example 2 | Example 3 | Comparative Example |
| Example 1 Fiber (v/v) | 1.85 | — | — | — |
| Example 2 Fiber (v/v) | — | 1.85 | — | — |
| Example 3 Fiber (v/v) | — | — | 1.85 | — |
| Comparative Example Fiber (v/v) | — | — | — | 1.85 |
| Concrete (v/v) | 98.15 | 98.15 | 98.15 | 98.15 |
| TOTAL (v/v) | 100 | 100 | 100 | 100 |

The concrete mixture in Table II is a reaction product of binder, aggregate, and water with the binder present in an amount of 68 parts by weight, the aggregate present in an amount of 15 parts by weight, and the water present in an amount of 17 parts by weight.

Microfibers, having a diameter of 0.04 millimeter are formed in the same way as described in Table I for Example 2 and the Comparative Example. These microfibers are then dispersed in Portland cement-based concrete at 1.85% volume fraction to form two mixtures. The concrete including the fibers is then moist cured to form two samples, an inventive sample and a comparative sample. The samples are evaluated to determine tensile stress capacity and ductility as a function of displacement in a uniaxial tension test, as shown in FIG. 2. This Figure shows that the tensile strength of the inventive sample is much higher than the tensile strength of the comparative example.

Figure 3:
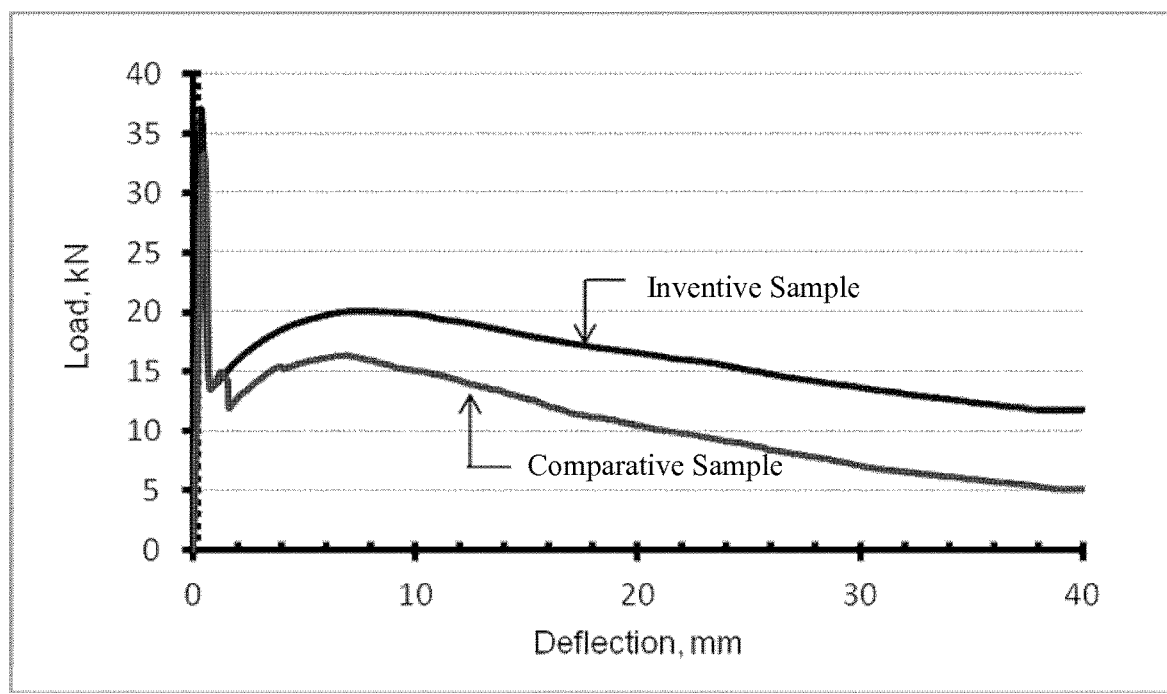
FIG. 3 is a line graph of load as a function of deflection of inventive and comparative sample of the Examples.

Additional macrofibers, having a diameter of 0.82 millimeter are formed in the same way as described in Table I for Example 2 and the Comparative Example. These microfibers are then dispersed in Portland cement-based concrete at 0.6% volume fraction to form two mixtures. The concrete including the fibers is then moist cured to form two samples, an inventive sample and a comparative sample. The samples are evaluated to determine energy absorption as a function of deflection according to ASTM C1550, as shown in FIG. 3. This Figure shows that the energy absorption or toughness (area under the curve) is much higher for the inventive sample than for the comparative sample.

Still additional macrofibers, having a diameter of 0.82 millimeter are formed in the same way as described above from Examples 1-3 and the Comparative Example. These macrofibers are then dispersed in Portland cement-based concrete at 0.6% volume fraction to form four mixtures. The concrete including the fibers is then moist cured to form four samples, three inventive samples and a comparative sample. The samples are evaluated to determine energy absorption as a function of deflection according to ASTM C1550, as described above. After testing, the effectiveness of the varying amounts of the metal oxide is evaluated and reported as bonding efficiency of the fibers to the concrete, as set forth in Table III below wherein the bonding efficiency is the energy absorption for a particular Example normalized to the value for the Comparative Example.

TABLE III

| Component | Example 1 | Example 2 | Example 3 | Comparative Example |
|---|---|---|---|---|
| Bonding Efficiency | 1.31 | 1.37 | 1.27 | 1.00 |

These values of bonding efficiency imply that the different levels of the metal oxide for Example 1, Example 2 and Example 3 produce fibers that, respectively, have 31%, 37% and 27% better performance in concrete than the Comparative Example.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present disclosure independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present disclosure, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims.

In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present disclosure has been described herein in an illustrative manner, and it is to be understood that the terminology which has been used is intended to be in the nature of words of description rather than of limitation. Many modifications and variations of the present disclosure are possible in light of the above teachings. The present disclosure may be practiced otherwise than as specifically described within the scope of the appended claims. The subject matter of all combinations of independent and dependent claims, both singly and multiply dependent, is herein expressly contemplated.

What is claimed is:

1. A composite material comprising: a cementitious composition; and a plurality of fibers disposed in said cementitious composition, each of said plurality of fibers comprising;
    a plastic component,
    a surfactant, and
    a metal oxide;
    wherein each of said surfactant and said metal oxide is independently heterogeneously dispersed throughout each of said plurality of fibers, wherein said metal oxide comprises silicon dioxide, and
    wherein said surfactant is chosen from the group of an alcohol alkoxylate, an alcohol block/heteric alkoxylate, a polyoxyethylene/polyoxypropylene block/heteric copolymer, a fatty alcohol, a fatty alkoxy alcohol, a polyalkylene glycol, a alkylphenol alkoxylate, and combinations thereof.

2. The composite material of claim 1 wherein said metal oxide is present in an amount of from 0.1 to 5 weight percent based on a total weight of said plurality of fibers.

3. The composite material of claim 1 wherein said surfactant is an alcohol alkoxylate.

4. The composite material of claim 1 wherein said surfactant is an alcohol block/heteric alkoxylate.

5. The composite material of claim 1 wherein said surfactant is a polyoxyethylene/polyoxypropylene block/heteric copolymer.

6. The composite material of claim 1 wherein said surfactant is a fatty alcohol.

7. The composite material of claim 1 wherein said surfactant is a fatty alkoxy alcohol.

8. The composite material of claim 1 wherein said surfactant is a polyalkylene glycol.

9. The composite material of claim 1 wherein said surfactant is an alkylphenol alkoxylate.

10. The composite material of claim 1 wherein said surfactant has an average molecular weight of less than or equal to 100,000 g/mol.

11. The composite material of claim 1 wherein each of said plurality of fibers comprises greater than 0 to less than or equal to 10 parts by weight of said surfactant based on 100 parts by weight of each of said plurality of fibers.

12. The composite material of claim 1 wherein said plastic component is chosen from the group of polyolefins, polyolefin elastomers, polystyrene, polyvinyl chloride, and combinations thereof.

13. The composite material of claim 12 wherein said polyolefin is polyethylene, polypropylene, polymethylpentene, polybutene-1, or combinations thereof.

14. The composite material of claim 1 wherein each of said plurality of fibers comprises at least 90 parts by weight of said plastic component based on 100 parts by weight of each of said plurality of fibers.

15. The composite material of claim 1 wherein said cementitious composition is further defined as concrete.

16. The composite material of claim 1 wherein said plurality of fibers is present in an amount of from 0.1 to 5 parts by weight based on 100 parts by weight of said composite material.

17. A method of forming a composite material comprising a cementitious composition, and a plurality of fibers disposed in the cementitious composition and comprising a plastic component, a surfactant, and a metal oxide, said method comprising the steps of:
combining the plastic component, the surfactant, and the metal oxide to form the plurality of fibers; and
disposing the plurality of fibers in the cementitious composition to form the composite material;
wherein each of the surfactant and the metal oxide is independently heterogeneously dispersed throughout each of said plurality of fibers,
wherein the surfactant is chosen from the group of an alcohol alkoxylate, an alcohol block/heteric alkoxylate, a polyoxyethylene/polyoxypropyl ene block/heteric copolymer, a fatty alcohol, a fatty alkoxy alcohol, a polyalkylene glycol, a alkylphenol alkoxylate, and combinations thereof, and wherein said metal oxide comprises silicon dioxide.

18. The method of claim 17 wherein the step of combining the plastic component and the surfactant to form the plurality of fibers includes:
extruding the plastic component, the surfactant, and the metal oxide through a first extruder at a temperature of from 185° C. to 215° C. to form at least one strand;
quenching the at least one strand with water and subsequently cutting the at least one strand quenched with water to form pellets; and
extruding the pellets through a second extruder to form the plurality of fibers.

19. The method of claim 18 wherein the first extruder is further defined as a single screw extruder.

20. The method of claim 19 wherein the first extruder is further defined as a twin screw extruder.

21. The method of claim 18 wherein the first extruder has a length to diameter ratio (L/D) of from 35 to 1 to 45 to 1.

22. The method of claim 18 wherein the first extruder comprises a screw rotating at a speed of 140 to 160 revolutions per minute (RPM).

23. A composite material comprising: a cementitious composition;
and a plurality of fibers disposed in said cementitious composition, each of said plurality of fibers comprising;
polypropylene,
a surfactant chosen from the group of an alcohol alkoxylate, an alcohol block/heteric alkoxylate, a polyoxyethylene/polyoxypropylene block/heteric copolymer, a fatty alcohol, a fatty alkoxy alcohol, a polyalkylene glycol, a alkylphenol alkoxylate, and combinations thereof and present in an amount of greater than 0 to 10 weight percent based on a total weight of said plurality of fibers, and
silicon dioxide present in an amount of from 0.1 to 5 weight percent based on a total weight of said plurality of fibers;
wherein each of said surfactant and said silicon dioxide is independently heterogeneously dispersed throughout each of said plurality of fibers.

* * * * *